Figure 1:
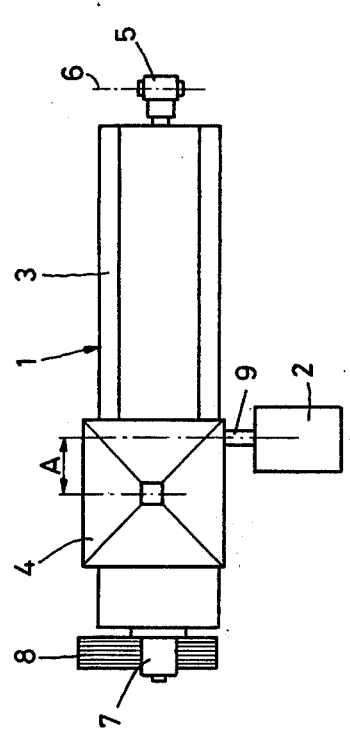

United States Patent [19]

Kertscher

[11] 4,135,825
[45] Jan. 23, 1979

[54] INSTALLATION FOR EXTRUDING PLASTICS

[75] Inventor: Eberhard Kertscher, Romanel, Switzerland

[73] Assignee: Maillefer S.A., Ecublens, Switzerland

[21] Appl. No.: 729,016

[22] Filed: Oct. 4, 1976

[30] Foreign Application Priority Data

Oct. 10, 1975 [CH] Switzerland .................. 13180/75

[51] Int. Cl.² .............................................. A21C 1/06
[52] U.S. Cl. ...................... 366/79; 366/318; 425/208
[58] Field of Search ............... 259/191, 192, 193; 425/207, 208, 209

[56] References Cited

U.S. PATENT DOCUMENTS

| | | | |
|---|---|---|---|
| 2,496,625 | 2/1950 | Henning | 259/193 |
| 3,177,272 | 4/1965 | Plymale | 264/102 |
| 3,193,877 | 7/1965 | Edwards | 259/191 |
| 3,300,811 | 1/1967 | Berger | 259/192 |
| 3,632,255 | 1/1972 | Geyer | 425/208 |
| 3,797,808 | 3/1974 | Ma | 259/191 |
| 3,944,191 | 3/1976 | Karamatsu | 259/191 |

*Primary Examiner*—Herbert F. Ross
*Attorney, Agent, or Firm*—Stevens, Davis, Miller & Mosher

[57] ABSTRACT

An installation is provided for extruding plastic material comprising a screw extruder having a cylinder provided with a hopper near the rearward end of said cylinder and with an extrusion head secured to the forward end of said cylinder, and at least one pump having a delivery pipe connected to at least one port disposed in the wall of said cylinder for delivering an additional fluid product to said extruder through said port or ports during the extrusion operation, the inner surface of said cylinder including a zone provided with grooves extending downstream starting from said hopper over a limited distance, said port or ports opening out into one or more of said grooved zone, said grooved zone being followed by a smooth zone, the inside diameter of which is less than the maximum diameter measured from the bottoms of said grooves, and wherein said screw extruder is of essentially uniform dimensions at the point of said zone and the portion of said screw extruder immediately upstream thereof.

7 Claims, 2 Drawing Figures

INSTALLATION FOR EXTRUDING PLASTICS

This invention relates to an installation for extruding plastic material, comprising a screw extruder having a cylinder provided with a hopper near the rearward end of the cylinder and with an extrusion head secured to the forward end of the cylinder, and at least one pump having a delivery pipe connected to at least one port disposed in the wall of the cylinder for delivering an additional fluid product to the extruder through the port or ports during the extrusion operation.

Installations of this kind are used especially for continuously applying an insulating covering to electric conductors, e.g., to cables. The plastic material in the form of pellets or powder is introduced into the hopper in bulk in such a way as to feed the extruder continuously. Within the extruder, this material is kneaded and heated, then forced into the extrusion head in a fluid and homogeneous state. In numerous applications, it is advantageous to add certain additives to the plastic material, e.g., colorants, oxidants such as certain peroxides, expansion agents intended to cause the material to swell during the treatment following extrusion, seed crystals, silicones such as silane, antioxidants, etc.

For a long time, these additives were mixed with the pelletized or powdered plastic material before introduction thereof into the hopper; this necessitated prior operations for preparing a mixture of the correct proportions, as well as mixing installations.

More recently, measuring dispensers have been produced which make it possible to introduce certain additives directly into the hopper. These dispensers are more particularly used for adding colorants or expansion agents which are solid products. Measuring dispensers are also known which enable solid or liquid additives to be introduced into the hopper.

However, although these means for introducing additives obviate the prior operations for preparing a mixture, they nevertheless have certain drawbacks. Thus, when a liquid additive is introduced into the hopper of the extruder at the same time as the pellets or powder of cold plastic material, it can combine with the dust separating from the plastic material to form an amalgam which is deposited on the walls of the hopper and can, after some time, plug its inlet opening. These deposits may cause irregularities in feed, thus disturbing the operation of the installation.

Another drawback derives from the fact that certain liquids used as additives are volatile at atmospheric pressure. This is true, for example, of certain expansion agents such as fluorinated hydrocarbons, the evaporation of which makes the precise admixture difficult to judge. Furthermore, the evaporation of certain peroxides may lead to a risk of explosion.

In order to remedy the aforementioned drawbacks, it has already been proposed to inject the additives directly into the cylinder of the extruder by connecting to the cylinder a pipe into which a pump delivers the additive at a suitable pressure. This pressure must be approximately the same as that prevailing in the cylinder at the injection location. Solutions of this kind are described especially in U.S. Pat. Nos. 3,177,272, 3,541,103, and 3,484,507, and in French Pat. No. 1,483,052. The additives introduced in this manner are either liquid colorants, emulsifiers, or bitumens.

However, the stable operation of a screw extruder requires operating conditions controlled with great accuracy; and when it is sought to obtain absolutely constant characteristics of temperature, pressure, and homogeneity at the outlet of the cylinder, it is indispensable to avoid any disturbance in the operation of the extruder. The pressure prevailing in the cylinder of the extruder in the zone in which the plastic material is already in a fluid state is the result of the conditions under which the pellets or powder introduced at the inlet of the cylinder are mixed in the plasticizing zone and gradually brought to their melting point. As indicated in U.S. Pat. No. 3,484,507, it has hitherto been thought that if a liquid additive were introduced into the cylinder in the plasticizing zone, the result would be a lessening of the friction of the partially liquefied plastic material against the inner surfaces of the cylinder and, consequently, a reduction in the feed of the extruder, which would disturb the operating conditions.

It was therefore necessary to provide a very long homogenizing zone, entailing the use of screws having a very great ratio of length to diameter, or to dispose an additional mixing device between the extrusion head and the cylinder.

It is known to make one or more longitudinal or spiralling grooves in the inner surface of the cylinder of certain extruders, in the region of the hopper, these grooves extending downstream for a distance of from two to ten times the diameter of the screw, starting from the axis of the hopper. These grooves facilitate the introduction of the material into the cylinder and increase the filling rate of the screw and, consequently, the feed of the extruder.

It is an object of this invention to provide an installation for extruding plastic material which is equipped with additive injection means and allows the use of standard screws, while at the same time operating with as large a discharge as possible and under conditions enabling the manufacture of high-quality insulated electric conductors.

To this end, in the installation according to the invention, the inner surface of the cylinder includes a zone provided with grooves extending downstream starting from the hopper over a limited distance, and the port or ports open out into one or more of the grooves in the vicinity of the downstream end of the grooved zone, this zone being followed by a smooth zone, the inside diameter of which is less than the maximum diameter measured from the bottoms of the grooves.

If the additive is injected in the vicinity of the downstream end of the grooved zone of the cylinder, it comes in contact with the plastic material at a location where this material is not yet melted; and contrary to what might be feared, the result is an increase in discharge and an increase in the filling rate of the screw, owing to the reduction in diameter at the end of the grooved zone. Hence it is possible to work with standard screws and to maintain an optimum extrusion discharge.

The arrangement defined above makes it possible to introduce any kind of fluid additive, be it a colorant, an emulsifier, a volatile liquid, or whatever.

Figure 2:
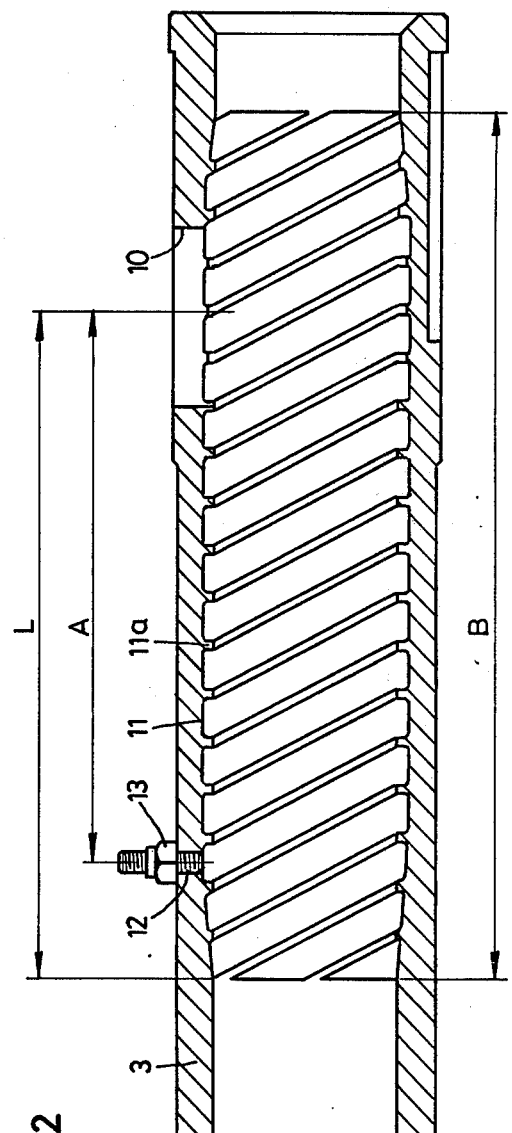

A preferred embodiment of the invention will now be described in detail with reference to the accompanying drawing, in which:

FIG. 1 is a plan view of a screw extruder equipped with an additive-delivery pump, and FIG. 2 is a longitudinal section, on a larger scale, showing the upstream portion of the extruder cylinder.

The installation shown in the drawing comprises a screw extruder of a known type, designated as a whole by reference numeral 1, and a pump 2. A cylinder 3 of the extruder 1 is provided with a hopper 4 situated near the upstream end thereof and intended for introducing plastic material in the form of powder or pellets. At its downstream end, the cylinder 3 bears an extrusion head 5 which, in the embodiment illustrated, is a transverse head, the axis 6 of which is perpendicular to the axis of the cylinder 3. An electric conductor to be coated with a layer of plastic insulation is intended to be guided along the axis 6. The screw (not shown) of the extruder 1 is integral with a drive pulley 7 which is situated outside the cylinder 3 at the upstream end thereof and can be rotatingly driven by belts from a drive pulley 8. The pump 2 comprises a delivery pipe 9 perpendicular to the axis of the cylinder 3 and connected to the cylinder 3 at a point situated at a distance A downstream from the axis of the hopper 4. The pump 2 may be of any known type. Preferably, it will be a piston pump, a diaphragm pump, a gear pump, or a peristaltic pump with an elastic tube, according to the nature of the additive to be introduced. The pump 2 will be equipped with a non-return valve, and its flow will be regulated as a function of that of the extruder 1. Thus, for example, in the case of a rotary volumetric pump, provision may be made for a regulating device controlling the speed of the pump according to that of the screw.

The arrangement of the upstream portion of the cylinder 3 is shown in more detail in FIG. 2. The plastic material in the form of pellets or powder enters the cylinder 3 through an opening 10. In a zone of length B starting upstream from the opening 10 and ending at a distance L from the axis of that opening, the inner surface of the cylinder 3 exhibits a series of parallel, spiralling grooves 11 of rectangular cross-section, having either sharp or rounded angles. These grooves might also have a sawtooth profile. The distance L may be from one to ten times the diameter of the screw. The grooves 11 are of constant depth in most of the zone B but gradually decrease in depth at the two ends thereof. Downstream from the zone B, the latter is followed by a zone in which the inner surface of the cylinder 3 is smooth and the inside diameter thereof is less than that measured from the bottoms of the grooves 11. In the embodiment described here, the diameter of the smooth zone situated downstream from the zone B is the same as that of the summits of ribs 11a remaining between the grooves 11. A port 12 passes through the wall of the cylinder 3 to open out into the bottom of one of the grooves 11. The axis of the port 12 is situated at a distance from the downstream end of the zone B which is equal, in the embodiment being described, to half the diameter of the screw. The port 12 is threaded and provided with a coupling 13 which is connected to the delivery pipe 9 of the pump 2, so that the fluid delivered by the pump 2 enters the groove 11 into which the port 12 opens out. This fluid, which is delivered at a pressure slightly greater than that prevailing within the cylinder 3 at the location of the port 12, is conveyed in the groove 11 and gradually mixed with the plastic material which, at this location, is already in a partially but not completely fluid state, and the temperature of which is higher than the entry temperature.

It is to be understood that the number and arrangement of the grooves may be different from what is shown in the drawing. In particular, the grooves 11 might extend parallel to the axis of the cylinder 3 instead of spiralling. The distance between the axis of the port 12 and the downstream end of the grooved zone might be other than half the diameter of the screw. Preferably, however, it will be between zero and once the diameter of the screw, for the pressure conditions prevailing at this location in the cylinder 3 are favourable for the delivery of the additives. It has been found that with the arrangement shown in the drawing, the mixture of the additive introduced through the pipe 9 and the already partially fluidized plastic material takes place under very regular conditions and that the additive is homogeneously distributed throughout the fluid plastic material when the latter arrives at the extrusion head 5.

It would naturally also be possible to provide several ports, distributed around the cylinder 3, instead of the single port 12. Thus, for example, provision might be made for four ports 12, the axes of which would be situated in a single plane perpendicular to the axis of the screw, each of these ports opening out into one of the grooves 11, so that all of the latter would be supplied with additive. In this case, the couplings 13 could be connected to a common collector surrounding the cylinder 3 and itself connected to the delivery pipe 9 of the pump 2.

However, each of the ports 12 might also be connected to a different pump, and different additives might thus be introduced into the different grooves, e.g., a colorant, an expansion agent, and a lubricant. Hence the arrangement described makes possible the injection of the additive or additives under the best possible conditions.

In conclusion, it may also be stated that it is possible to associate with the described installation a continuous weighing device which regulates the supply of plastic pellets or powder to the hopper 4 and which is, for example, so arranged as to maintain the top of the heap of pellets or powder in the hopper 4 at a constant level.

What is claimed is:

1. An installation for extruding plastic material comprising a screw extruder having a cylinder provided with a hopper near the rearward end of said cylinder for introducing said plastic material into said cylinder, and with an extrusion head secured to the forward end of said cylinder, for receiving said plastic material in a fluid state, and at least one pump having a delivery pipe connected to at least one port disposed in the wall of said cylinder for delivering an additional fluid product to said extruder through said port or ports during the extrusion operation, said cylinder comprising a first zone wherein the inner surface thereof being provided with grooves and a second zone located downstream with respect to said first zone and wherein the inner surface of the cylinder is smooth, and port or ports opening out into one or more of said grooves at a location of said first zone in the vicinity of the downstream end thereof, said plastic material being at said location at a temperature higher than the temperature at said readward end and in an incompletely fluid state, the inside diameter of the cylinder in said second zone being less than the maximum diameter measured from the bottom of said grooves, and said screw extruder being of essentially uniform dimensions within said second zone and in the portion of said screw extruder immediately upsteam thereof.

2. An installation in accordance with claim 1, wherein the depth of said grooves gradually decreases at least at said downstream end of said grooved zone.

3. An installation in accordance with claim 2, wherein said port or ports are separated from said downstream end of said grooved zone by a distance approximately equal to half the diameter of the screw.

4. An installation in accordance with claim 2, comprising a plurality of said pumps separately feeding a plurality of said grooves of said cylinder.

5. An installation in accordance with claim 1, wherein the downstream limit of said grooved zone of said cylinder is situated at a distance from said hopper of between one and ten times the diameter of the screw.

6. An installation in accordance with claim 1, wherein said grooved zone comprises a plurality of parallel, spiralling grooves, the number of said ports being equal to the number of said grooves, and each said port opening out into a different said groove.

7. An installation in accordance with claim 1, further comprising means for regulating the flow of said extruder and of said pump or pumps and being controlled by the speed of rotation of the screw.

* * * * *